(12) United States Patent
Bushell (10) Patent No.: US 7,710,426 B1
(45) Date of Patent: May 4, 2010

(54) BUFFER REQUIREMENTS RECONCILIATION

(75) Inventor: John Samuel Bushell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 786 days.

(21) Appl. No.: 11/113,361

(22) Filed: Apr. 25, 2005

(51) Int. Cl.
*G06F 12/02* (2006.01)
*G06F 5/00* (2006.01)
*G06F 13/00* (2006.01)

(52) U.S. Cl. .......................... 345/543; 710/56; 711/131
(58) Field of Classification Search .................. 710/56; 711/131; 345/543
See application file for complete search history.

(56) References Cited

U.S. PATENT DOCUMENTS

| | | | | |
|---|---|---|---|---|
| 4,458,316 | A | * | 7/1984 | Fry et al. .................. 710/52 |
| 4,603,382 | A | * | 7/1986 | Cole et al. ................ 710/56 |
| 5,033,105 | A | | 7/1991 | Atkinson |
| 5,046,119 | A | | 9/1991 | Hoffert et al. |
| 5,129,059 | A | * | 7/1992 | Hannah .................. 345/571 |
| 5,212,742 | A | | 5/1993 | Normile et al. |
| 5,237,397 | A | | 8/1993 | Mighdoll et al. |
| 5,241,658 | A | | 8/1993 | Masterson et al. |
| 5,267,334 | A | | 11/1993 | Normille et al. |
| 5,335,299 | A | | 8/1994 | Atkinson |
| 5,461,679 | A | | 10/1995 | Normile et al. |
| 5,517,612 | A | * | 5/1996 | Dwin et al. .............. 345/502 |
| 5,524,214 | A | * | 6/1996 | Kurihara .................. 710/56 |
| 5,544,327 | A | * | 8/1996 | Dan et al. ................ 709/234 |
| 5,841,431 | A | * | 11/1998 | Simmers .................. 345/211 |
| 6,016,360 | A | | 1/2000 | Nguyen et al. |
| 6,573,846 | B1 | | 6/2003 | Trivedi et al. |
| 6,611,215 | B2 | * | 8/2003 | Miller et al. ............... 341/61 |
| 6,728,315 | B2 | | 4/2004 | Haskell et al. |
| 6,781,529 | B1 | | 8/2004 | Lin et al. |
| 2002/0099758 | A1 | * | 7/2002 | Miller et al. ............. 709/104 |
| 2002/0136294 | A1 | | 9/2002 | Culbert |
| 2004/0107322 | A1 | * | 6/2004 | Mulligan ................. 711/147 |
| 2005/0237327 | A1 | * | 10/2005 | Rubinstein et al. ........ 345/519 |

* cited by examiner

*Primary Examiner*—Xiao M Wu
*Assistant Examiner*—Tize Ma
(74) *Attorney, Agent, or Firm*—Fish & Richardson P.C.

(57) ABSTRACT

Buffers may be shared between components in a system. The components may be loosely coupled, allowing the components to be assembled into various different configurations, and yet buffers may still be shared. A buffer requirements negotiator of the system analyzes the buffer requirements of each of the components and determines, if possible, a set of requirements that satisfies all of the components. Accordingly, savings may be achieved in buffer memory, as well as in copying and converting between unshared buffers. Further, the individual components may operate as efficiently as possible because the buffer requirements of the components in the system are all met. One implementation accesses a first component's buffer requirements and a second component's buffer requirements, determines a reconciled set of buffer requirements that satisfies the buffer requirements of both components, and provides the reconciled set of buffer requirements to one or more components.

44 Claims, 6 Drawing Sheets

| COMPONENT DESCRIPTION | BUFFER REQUIREMENTS | | |
|---|---|---|---|
| | FORMAT(S) | W×H | BYTE ALIGNMENT | EXTENDED PIXELS |
| VIDEO DECODER (OUTPUT) | RGB-2 OR 3 | 640 × 480 | 16 | 4 SIDES - 15 PIXELS |
| DISPLAY DEVICE (INPUT) | RGB-2 | 1000 × 800 (SCALABLE) | 32 | NONE NEEDED |

BUFFER REQUIREMENTS RECONCILIATION

TECHNICAL FIELD

This document relates to memory management.

BACKGROUND

Components in a processing system frequently exchange or share data, and the data often is stored in separate buffers, for example, a dedicated buffer for each of the components involved in the exchange. When the data is to be exchanged, the processing system typically copies the data from a buffer of a sending component into a buffer of a receiving component. Before copying, the processing system may also need to convert the data from a buffer format of the sending component into a buffer format required by the receiving component.

SUMMARY

Various described implementations allow multiple components to use a common buffer to exchange or share data, rather than allocating and using a separate buffer for each component. In this way, buffer space is saved and the exchanged or shared data does not need to be copied or converted between separate buffers. The requirements of the buffers, for each of the components that is exchanging or sharing data, are submitted to a buffer requirements negotiator. The buffer requirements negotiator attempts to find a set of requirements that is acceptable to all of the components. If successful in the negotiation, the buffer requirements negotiator provides the negotiated requirements to an appropriate entity or entities so that the buffer can be allocated according to the negotiated requirements. If unsuccessful, in the negotiation, the separate components may allocate and use separate buffers. Implementations also may share a common group of buffers between components, effectively enabling each component to have access to multiple shared buffers.

According to one general aspect, a set of buffer requirements is accessed for each of multiple components, including at least a first set of buffer requirements relating to a first component and a second set of buffer requirements relating to a second component. A reconciled set of buffer requirements is determined that satisfies both the first set of buffer requirements and the second set of buffer requirements. The reconciled set of buffer requirements is provided to one or more components.

Implementations may include one or more of the following features. For example, it may be determined that the first set of buffer requirements is not the same as the second set of buffer requirements. The first and second sets of buffer requirements may each relate to data that is to be exchanged between the first and second components. The data may relate to video frame pixels. The first and second sets of buffer requirements may relate to an output of the first component and an input of the second component, respectively.

Determining a reconciled set of buffer requirements may include comparing the first and second sets of buffer requirements to determine if they overlap. Providing the reconciled set of buffer requirements to one or more components may include providing the reconciled set of buffer requirements to the first and second components or to a component manager.

A buffer may be allocated that conforms to the reconciled set of buffer requirements, and the buffer may be shared between the first and second components. The buffer may be accessed by both the first and second components. The first component may access the buffer by writing to the buffer, and the second component may access the buffer by reading from the buffer.

The first component may include a first video processing component, and accessing a first set of buffer requirements for a first component may include accessing a set of buffer requirements for the first video processing component. The second component may include a second video processing component and accessing a second set of buffer requirements for a second component may include accessing a set of buffer requirements for the second video processing component.

The first video processing component may include one of a video decoder, a video compressor, and a video filter. The reconciled set of buffer requirements may include one or more of a data format, a width of the buffer, a height of the buffer, a byte alignment requirement, and an extended pixels requirement.

Determining the reconciled set of buffer requirements may include determining (1) whether a particular requirement of both the first and second sets of buffer requirements overlap, (2) whether a particular requirement of both the first and second sets of buffer requirements is scalable, (3) a least common multiple of a particular requirement of both the first and second sets of buffer requirements, or (4) a maximum size among a particular requirement of both the first and second sets of buffer requirements.

A third set of buffer requirements may be accessed, the buffer requirements relating to data used by a third component. Determining a reconciled set of buffer requirements may include determining a reconciled set of buffer requirements that satisfies all of the first, second, and third sets of buffer requirements.

According to another general aspect, a first set of buffer requirements for a first component is received, and a second set of buffer requirements for a second component is received. A reconciled set of buffer requirements is negotiated that meets both the first set of buffer requirements and the second set of buffer requirements. The reconciled set of buffer requirements are made available to one or more components.

According to another general aspect, a set of buffer requirements is accessed for each of multiple components, including at least a first set of buffer requirements relating to a first component and a second set of buffer requirements relating to a second component. It is determined that the first set of buffer requirements is not the same as the second set of buffer requirements. An attempt is made to determine a reconciled set of buffer requirements that satisfies both the first set of buffer requirements and the second set of buffer requirements.

Implementations may include one or more of the following features. For example, attempting to determine a reconciled set of buffer requirements may include (1) determining that the first and second sets of buffer requirements are not reconcilable, or (2) determining that the first and second sets of buffer requirements are reconcilable, and determining the reconciled set of buffer requirements. One or more of the first and second components may be enabled to use multiple buffers.

According to another general aspect, a set of buffer requirements is accessed for each of multiple components. A reconciled set of buffer requirements is determined that satisfies buffer requirements for two or more of the multiple components.

Implementations may include one or more of the following limitations. For example, it may be determined that all of the multiple sets of buffer requirements cannot be reconciled together. Determining a reconciled set of buffer requirements may include determining a reconciled set of buffer requirements that satisfies buffer requirements for less than all of the multiple components.

The above features and aspects may be implemented in, for example, a system, a device, a process, or a computer readable medium including instructions for performing a process.

The details of one or more implementations are set forth in the accompanying drawings and the description below. Other features will be apparent from the description and drawings, and from the claims.

DETAILED DESCRIPTION

In a particular implementation of a movie processing system, various components exchange or share large quantities of data related to video images. The buffers for this data may be large, so an attempt is made to have components share buffers. However, the components may have conflicting requirements for the characteristics of the buffers, so the implementation considers these various requirements and determines a single set of requirements that satisfy each of the components.

Figure 1:
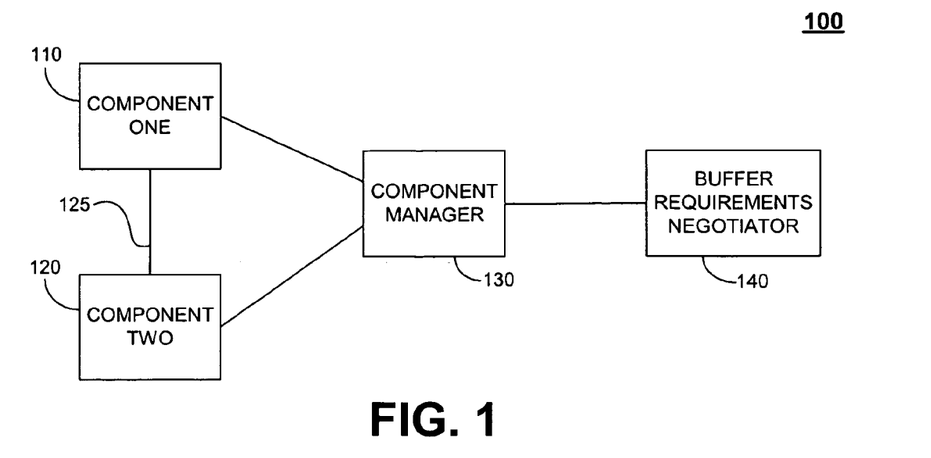
FIG. 1 is a block diagram of one general architecture for use with a buffer requirements negotiator.

Referring to FIG. 1, a system 100 includes a first component 110 and a second component 120 that may be, for example, video processing components. First and second components 110 and 120 share data between them as indicated by a connection 125 shown between first and second components 110 and 120. First and second components 110 and 120 are managed, or controlled, by a component manager 130, and component manager 130 communicates with a buffer requirements negotiator ("BRN") 140 to negotiate buffer requirements for first and second components 110 and 120.

System 100 may represent a variety of different implementations, as will be explained with reference to FIGS. 2 and 7-9. Further, first and second components 110 and 120, as well as component manager 130 and BRN 140, may be part of an environment, such as, for example, an application development environment, that allows additional implementations to be created using one or more of components 110, 120, 130, and 140, as well as other components. The components within one of these additional implementations might have different buffer requirements, such that buffers could not be shared between the components. This may contrast, for example, with an application in which the components have been individually designed so that the components can share buffers. However, by using BRN 140 to reconcile buffer requirements, it may be possible to share buffers between the components of these additional implementations.

BRN 140 thus may provide flexibility to an environment to allow loosely coupled components to be combined in various configurations depending on a high-level goal, and still to operate efficiently. Each of the components may be designed to operate efficiently when that component's buffer requirements are satisfied, but the various components available in an environment may not all be designed to have matching buffer requirements nor to have knowledge of the buffer requirements of other components that is, the components may be loosely coupled. Indeed, the components may be designed by different developers that are not aware of the designs of other components. Further, the components may be assembled to work together for the first time by a customer, and the components may be able to programmatically describe their own buffer requirements. BRN 140 helps to enable the buffer requirements of the various looselycoupled components to be satisfied, however, even when the components are combined in a configuration that results in mismatched buffer requirements. As long as the mismatch can be negotiated by BRN 140, buffers may be shared, and the components may operate efficiently internally.

Without BRN 140, buffers might not be able to be shared, resulting in inefficient allocation of buffers, copying of buffers, and possibly converting of buffer contents. Alternatively, but still without BRN 140, if buffer sharing is enabled without reconciling buffer requirements, buffer mismatches may be accommodated by the components determining to use a less efficient internal algorithm that is able to operate with the available characteristics of a shared buffer. For example, a component might not get the scratch space desired and may, accordingly, use a less-efficient algorithm that does not require scratch space.

Figure 2:
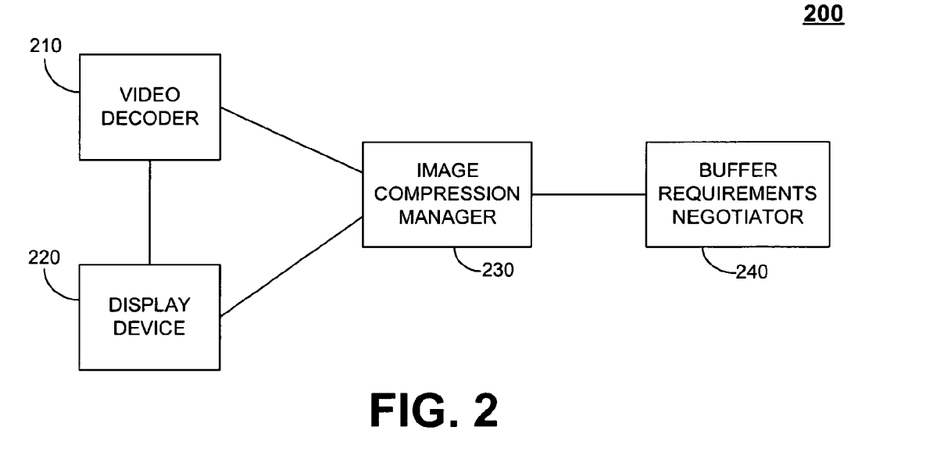
FIG. 2 is a block diagram of a specific implementation of the general architecture of FIG. 1.

Referring to FIG. 2, a system 200 includes a video decoder 210 and a display device 220 communicatively coupled to each other and to an image compression manager ("ICM") 230. Image compression manager is further communicatively coupled to a BRN 240. Components 210, 220, 230, and 240 correspond to specific implementations of components 110, 120, 130, and 140. Video decoder 210 and display device 220 may be part of a video processing application, with video decoder 210 being used to decode compressed video frames and to provide the decompressed video frames to display device 220. Display device 220 may be used, for example, to control a display device such as a television. Both video decoder 210 and display device 220 require buffers for decoded video frames and, if the buffer requirements of video decoder 210 and display device 220 can be reconciled, then video decoder 210 and display device 220 can share buffers rather than using separate buffers.

Figure 3:
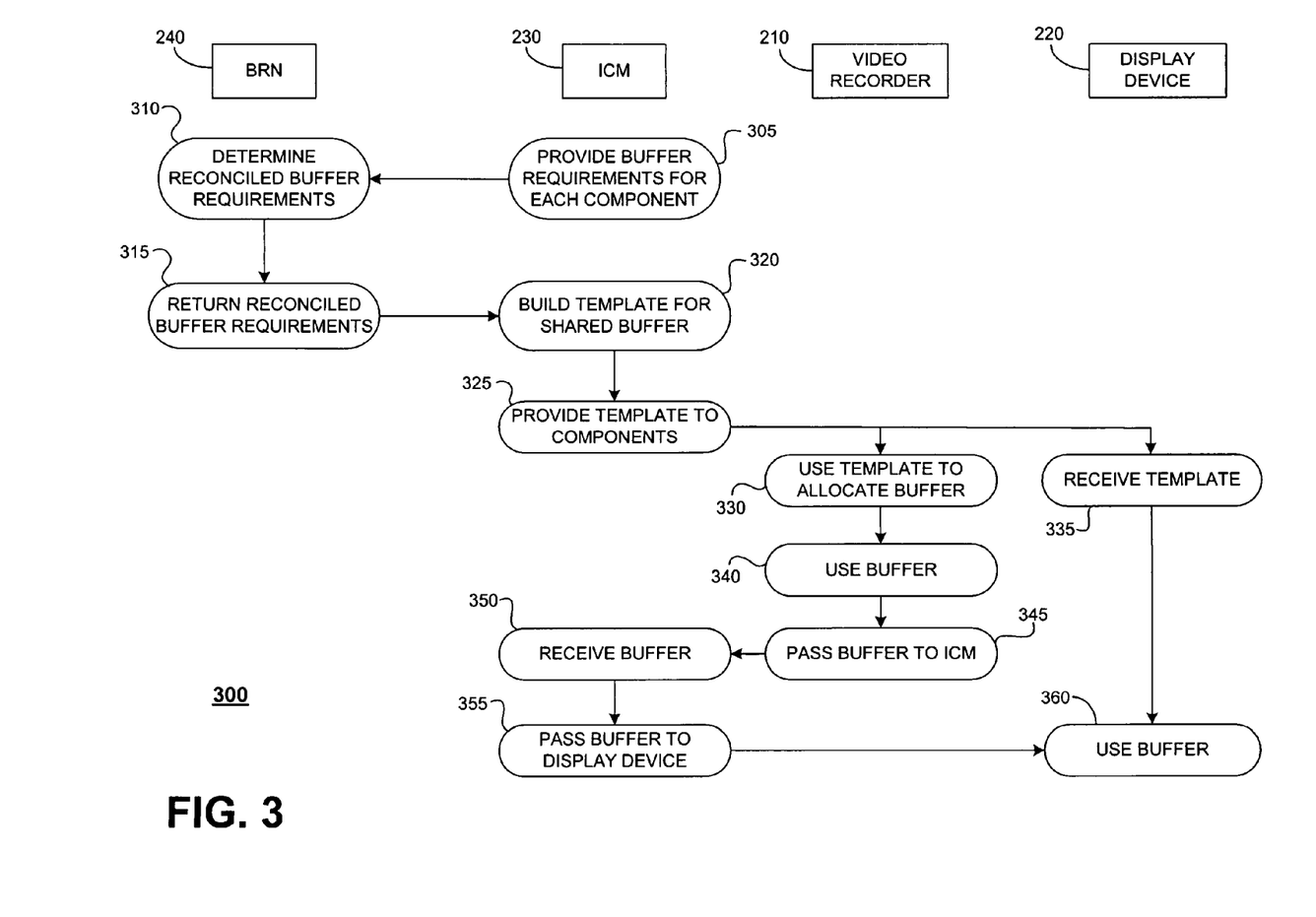
FIG. 3 is a flow diagram of one process for negotiating the requirements for, and using, a shared buffer in the implementation of FIG. 2.

Referring to FIG. 3, a process 300 is shown for reconciling the buffer requirements of video decoder 210 and display device 220. Process 300 includes ICM 230 providing to BRN 240 the buffer requirements for each of video decoder 210 and display device 220 (305). ICM 230 may access the buffer requirements for each of video decoder 210 and display device 220 by, for example, querying each component 210 and 220 for that component's buffer requirements, or looking up the buffer requirements in a database or other storage device in which the requirements may be stored. ICM 230 is presumed to know which buffer requirements need to be reconciled. That is, in system 200, ICM 230 is presumed to know that a buffer may possibly be shared between the output of video decoder 210 and the input of display device 220, and that there are no other components that may possibly be able to share such a buffer. In short, ICM 230 is presumed to have a knowledge of the configuration of system 200, although such knowledge might not be presumed in other implementations.

Figure 4:
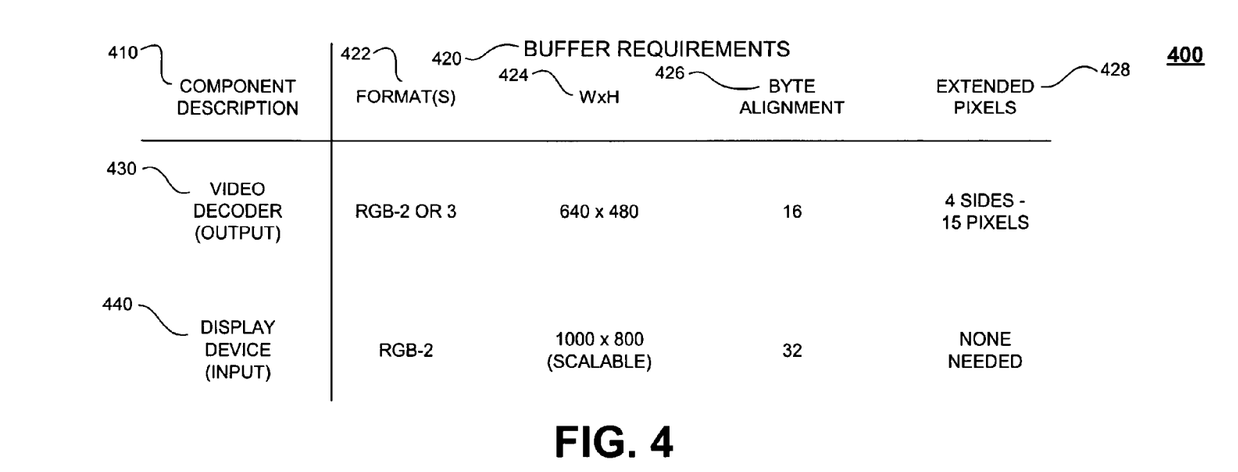
FIG. 4 is a table of buffer requirements for the shared buffer of FIG. 3.

Referring to FIG. 4, a table 400 may be used to explain one implementation of operation 305 in which ICM 230 provides a table of buffer requirements to BRN 240. Table 400 relates to a single potentially-shared buffer, and includes the buffer requirements provided by ICM 230 in operation 305. Table 400 is composed of a component description column 410 and a buffer requirements section 420. Component description column 410 describes each component that might share the buffer, and buffer requirements section 420 includes a column heading for each of the buffer requirement descriptions being considered. In the example of table 400, the buffer requirement descriptions include a format type 422 of a buffer, a width and a height ("W×H") 424 of a buffer, a byte alignment 426 of a buffer, and an extended pixels description 428 of a buffer, each of which will be explained below. Table 400 also includes a row for each component that may share the buffer, with each row storing the buffer requirements for the corresponding component. A first row 430 stores the buffer requirements for the output of video decoder 210, and a second row 440 stores the buffer requirements for the input of display device 220.

As indicated above, table 400 includes four buffer requirements. Format 422 refers to the data format(s) supported by a component for a buffer, such as, for example, one or more of a variety of red-green-blue ("RGB") formats or luminance-chrominance ("YUV") formats. W×H 424 refers to an allowable width and height of a buffer. Byte alignment 426 refers to the byte alignment that a component requires for a buffer. Extended pixel description 428 refers to any extended pixel requirements that a component may have for a buffer. Buffer requirements 422-428 are tailored to video processing systems, and other systems may include other requirements that may be tailored to video processing or to different types of applications.

Video processing systems, however, typically process video information in two-dimensional frames that represent data using a particular format (422) and that have a particular width and height (424). Additionally, video processing components such as encoders and decoders may want extra scratch memory (428) allocated on all four sides of the buffer to allow unrestricted motion vector operations to be performed for the edge of a frame without requiring another separate buffer. Further, efficiency may be increased if the address of the beginning of each row is divisible by a particular number (426). Other requirements also may be used, such as, for example, requiring the number of bytes per row, in a frame, to be a multiple of a particular number in order to increase efficiency.

The buffer requirements populating table 400 include: (1) for the output of video decoder 210, a data format 422 of RGB-2 or 3 (which stand for particular RGB formats), a W×H 424 of 640×480, a byte alignment 426 of 16, and extended pixels 428 on all four sides of the frame extending for 15 pixels, and (2) for the input of display device 220, a data format 422 of RGB-2, any W×H 424 (although 1000×800 is listed, the width and height are scalable so display device 220 can support any W×H and scale to arrive at the desired value of 1000×800), a byte alignment 426 of 32, and no extended pixels 428 are needed.

Buffer requirements may be described in a variety of manners. In various implementations, buffer requirements are referred to in terms of keys, values, and key/value pairs. A "key" refers to a type or category of buffer requirement (the variable). A "value" refers to the specific type of key required (the value of the variable). And a "key/value" pair refers to both the key and its particular value. For example, table 400 includes the four keys of format 422, W×H 424, byte alignment 426, and extended pixel requirements 428. As a further example, row 430 includes the four key/value pairs of (1) a format of RGB-2 or 3, (2) a W×H of 640×480, (3) a byte alignment of 16, and (4) an extended pixel requirement of 15 pixels on all 4 sides. Note that, to the extent an implementation may need details of a particular format 422, BRN 240 or some other module may maintain and access a dictionary of formats so that more specific information can be made available for the "values" of the format key, such as RGB-2.

Additionally, an entire set of key/value pairs can be referred to with a shorthand identifier. For example, the four key/value pairs described above for row 430 may be referred to with a shorthand identifier of "decoder." Shorthand identifiers may refer, for example, to a specific component, such as "decoder," a specific data element, or a specific technology.

Referring again to FIG. 3, when BRN 240 receives the buffer requirements provided by ICM 230 in operation 305, BRN 240 assumes that the received requirements are complete for the buffer under consideration and proceeds to determine, if possible, reconciled buffer requirements (310). If successful in reconciliation, BRN 240 returns the reconciled buffer requirements (315), otherwise BRN 240 returns an indication that the reconciliation was unsuccessful. If the reconciliation is unsuccessful, video decoder 210 and display device 220 use separate buffers. Note that in the implementation of process 300, BRN 240 is called to perform a relatively isolated task of attempting to reconcile buffer requirements that are provided to BRN 240. Accordingly, BRN 240 provides the result by replying to the component that called BRN 240. Other implementations may have BRN 240 communicate directly with the components being reconciled, or more indirectly by, for example, providing results to designated storage location. BRN 240 may provide results to one or more components, such as, for example, component 210, 220, or 230, or a component including a designated storage location.

Figure 5:
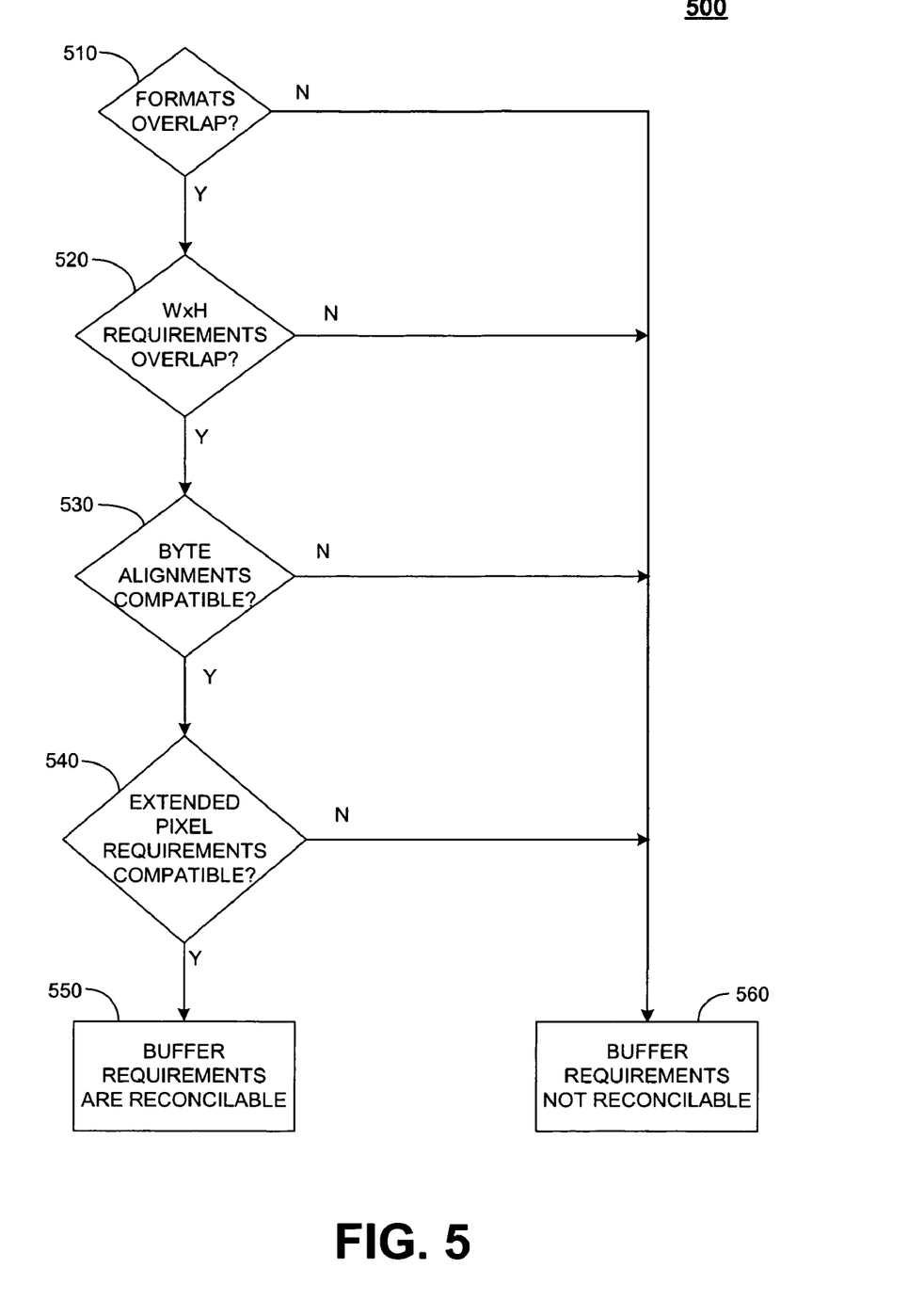
FIG. 5 is a flow chart of one process for determining whether particular buffer requirements can be reconciled.

Referring to FIG. 5, an algorithm 500 may be used to further explain operation 310. Algorithm 500 is used by BRN 240 in several implementations to reconcile buffer requirements. First, BRN 240 determines if the format requirements from each component overlap (510). In the present example, video decoder 210 requires a format of either RGB-2 or RGB-3, and display device 220 requires a format of RGB-2. Thus the formats do overlap because both components 210 and 220 support RGB-2.

Second, if the format requirements overlap, then BRN 240 determines if the W×H requirements from each component overlap (520). In the present example, video decoder 210 requires a W×H of 640×480, and display device 220 can support any W×H. Thus, the W×H requirements do overlap at a value of 640×480.

Third, if the W×H requirements match, then BRN 240 determines if the byte alignment requirements from each component are compatible (530). In the present example, video decoder 210 requires a byte alignment of 16, and display device 220 requires a byte alignment of 32. Because the byte alignment requirements are not the same, BRN 240 determines the lowest common multiple, which in this case is 32. A byte alignment of 32 provides, inherently, a byte alignment of 16 as well. That is, with a byte alignment of 32, the address at the beginning of each row is divisible by both 32 and 16. There will always be a lowest common multiple, so the byte alignments of the components can presumably always be reconciled (that is, the byte alignment requirements are always theoretically compatible). However, particular implementations may impose a maximum byte alignment to avoid devoting too much memory to a given buffer when the lowest common multiple is large.

Fourth, if the byte alignment requirements are compatible, then BRN 240 determines if the extended pixel requirements are compatible (540). In the present example, video decoder 210 requires 15 pixels on all four sides, and display device 220 does not require any extended pixels. Although display device 220 does not need any extended pixels, display device 220 can tolerate extended pixels. Accordingly, the extended pixel requirements are compatible by providing the requirements of video decoder 210.

If the extended pixel requirements are compatible, then BRN 240 determines that the buffer requirements are reconcilable and the negotiation is successful (550). However, if any of the four operations 510, 520, 530, or 540 produces a negative result, then the buffer requirements are not reconcilable and the negotiation is unsuccessful (560).

The reconciliation operation (310) in the present example produces a two-fold result. First, BRN 240 determines that the buffer requirements of the output of video decoder 210 and the input of display device 220 are reconcilable. Second, BRN 240 determines that the reconciled buffer requirements are (1) a data format of RGB-2, (2) a W×H of 640×480, (3) a byte alignment of 32, and (4) 15 extended pixels on all four sides. Note that an unsuccessful negotiation would have resulted if, for example, display device 220 had a buffer requirement of, for example, an RGB-1 or any YUV format, or a non-scalable W×H of 1000×800.

Process 500 considers various characteristics of a buffer that may be referred to as physical characteristics, such as, for example, the size of the buffer and the buffer's alignment. In other implementations, process 500 may consider other physical characteristics. Further, process 500 may consider various other characteristics that may be referred to as logical characteristics. For example, process 500 may determine whether each component that would use the shared buffer (1) has the same pixel aspect ratio, in which case scaling would not be needed, (2) has the same color space profile such that identical pixel values are interpreted to represent the same color, and (3) has the same clean aperture region, which refers to the displayable portion of the buffer. If any of these logical buffer requirements are not met, then these logical buffer requirements are not reconciled and the reconciliation is declared unsuccessful. Other implementations, however, attempt to negotiate the logical buffer requirements. For example, pixels may be modified to correspond to a new aspect ratio, color space profile, or clean aperture region.

Referring again to FIG. 3, after ICM 230 receives the reconciled buffer requirements from BRN 240, ICM 230 builds a template for the shared buffer according to the reconciled buffer requirements (320), and provides the template to video decoder 210 and display device 220 (325). Note that in process 300, neither of components 210 or 220 is explicitly informed of whether the buffer requirements were reconciled. The above-described portion of process 300 may generally be performed at initialization, with the remainder of process 300 being performed during runtime of the relevant components.

If the buffer requirements were not reconcilable (not shown), then BRN 240 would return a result to ICM 230 indicating that the reconciliation was not successful. In response, ICM 230 would build separate templates for each of components 210 and 220 according to their individually desired buffer characteristics, and send the separate templates to components 210 and 220.

Video decoder 210 receives the template and then uses the template to allocate a buffer satisfying the reconciled buffer requirements (330), and display device 220 also receives the template (335). The use of a template is one mechanism for using the reconciled buffer requirements, and enabling buffers to be allocated according to the reconciled buffer requirements. A template may take a variety of forms but includes the reconciled buffer requirements in some manner, such as, for example, a data structure. Video decoder 210 may allocate a buffer by passing the template to a buffer manager (not shown) such as, for example, a buffer pool that allocates and deallocates buffers.

Video decoder 210 uses the allocated buffer (340) to store a decoded frame of a video, and passes the buffer to ICM 230 (345). ICM 230 receives the buffer (350) and passes the buffer to display device 220 (355). Recall that ICM 230 serves as the component manager/controller. Accordingly, ICM 230 coordinates the interaction between components 210 and 220 by (1) calling video decoder 210 when, for example, a frame needs to be decoded, (2) receiving the decoded frame from video decoder 210 (350), and (3) passing the buffer containing the decoded frame to display device 220 for display (355).

Note that if the buffer reconciliation had been unsuccessful, ICM 230 would convert, as needed, and copy the information in the buffer received from video decoder 210 into a new buffer to send to display device 220. In such a case, ICM 230 also may be responsible for requesting the new buffer's allocation.

Display device 220 then uses the buffer (360). In order to use the buffer, display device 220 may consult the received template (335) to determine how the decoded frame is stored in the buffer. Display device 220 then displays, or manages the display of, the decoded frame in the buffer.

Video decoder 210, ICM 230, and display device 220 may use one or more of a variety of access control techniques to coordinate access to the shared buffer. For example, components 210, 220, and 230 may all be allowed to read from the buffer, but may use a copy-on-write or other locking protocol to modify the buffer contents. Additionally, components 210, 220, and 230 may use one or more of a variety of techniques to control the deallocation of the buffer. For example, components 210, 220, and 230 may increment and decrement a reference counter maintained by a buffer pool to indicate continued use of the buffer.

Other implementations may vary process 300 in a variety of ways. For example, ICM 230, rather than video decoder 210, may allocate the shared buffer. As another example, display device 220, rather than ICM 230, may perform the copy and conversion tasks for incoming buffers if the buffer requirements were not reconcilable. Display device 220 may, for example, compare the buffer characteristics of an incoming buffer against the buffer requirements of display device 220, and copy and convert if needed. More generally, one or more of the functions of ICM 230 may be performed in one or more of components 210 and 220. Further, one or more of the functions of BRN 240 may be performed by one or more of ICM 230 and/or components 210 and 220.

Figure 6:
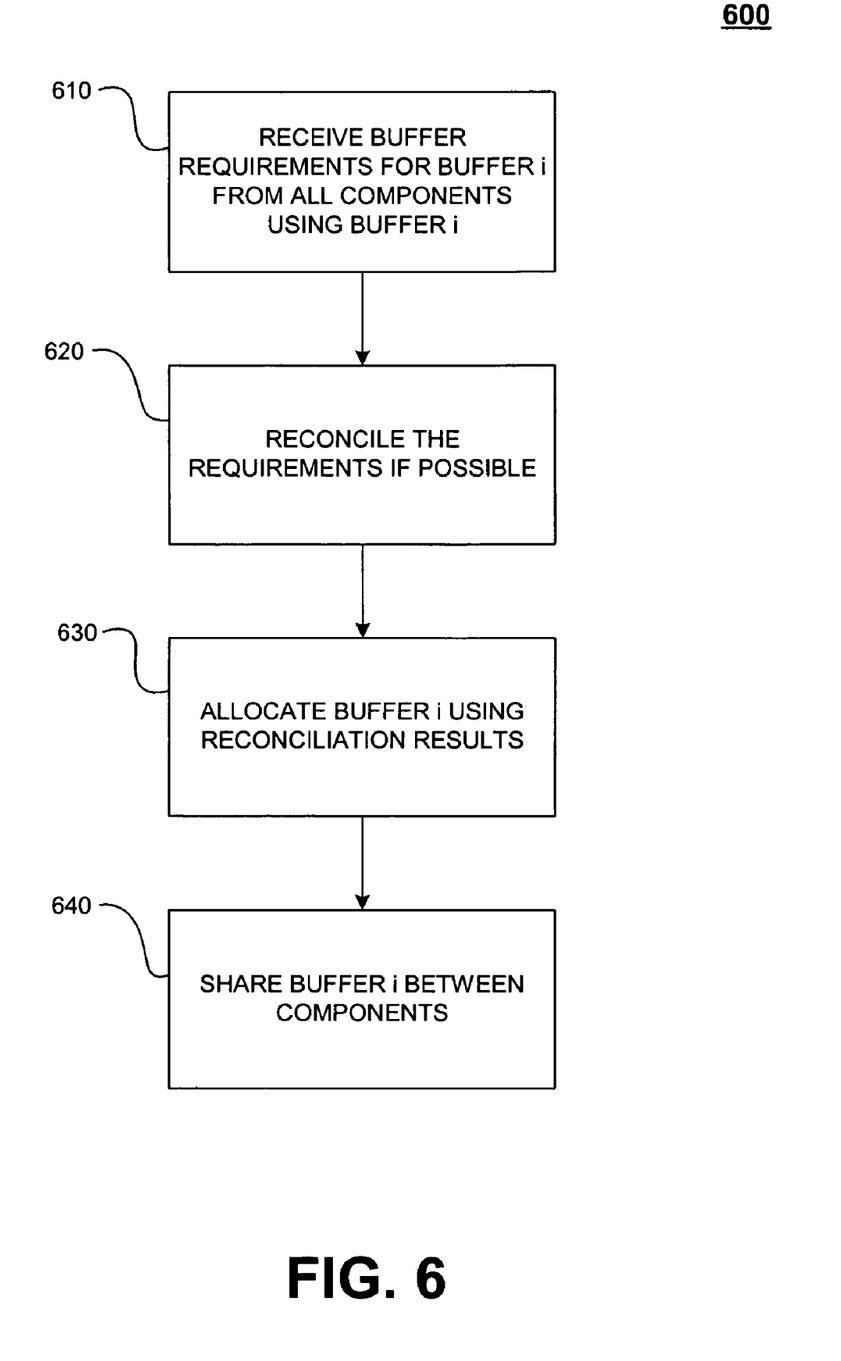
FIG. 6 is a flow chart of one general process for negotiating the requirements for, and using, a shared buffer.

Referring to FIG. 6, a process 600 provides a more generalized approach to reconciling buffer requirements and sharing a buffer. Process 600 includes receiving the buffer requirements for a given buffer (referred to as buffer "i") from all of the components that use the given buffer (610). Process 600 then reconciles the received buffer requirements if possible (620), and allocates buffer "i" according to the reconciled buffer requirements (630). Buffer "i" is then shared between two or more components (640). Process 600 may be performed by a variety of different components in its entirety, or by a combination of components. As an example, in process 300 operations 610-620 are performed by BRN 240, operation 630 is performed by video decoder 210, and operation 640 is performed by each of components 210, 220, and 230.

Figure 7:
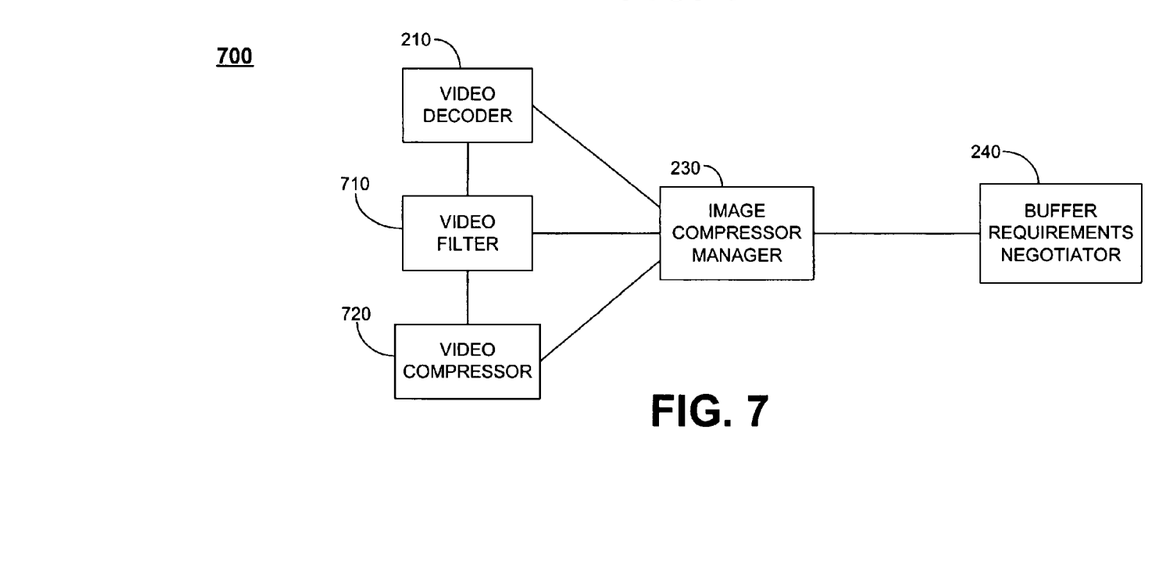
FIG. 7 is a block diagram of a second specific implementation of the general architecture of FIG. 1.
Figure 8:
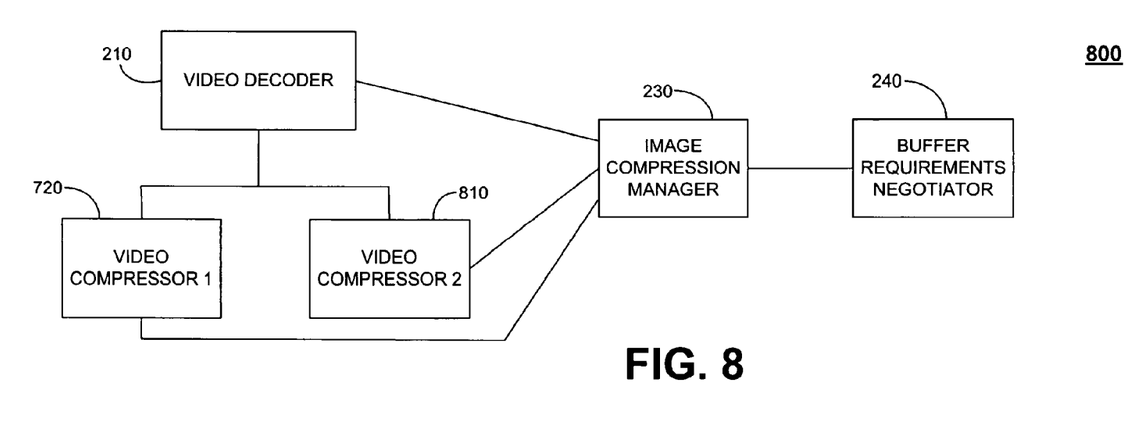
FIG. 8 is a block diagram of a third specific implementation of the general architecture of FIG. 1.
Figure 9:
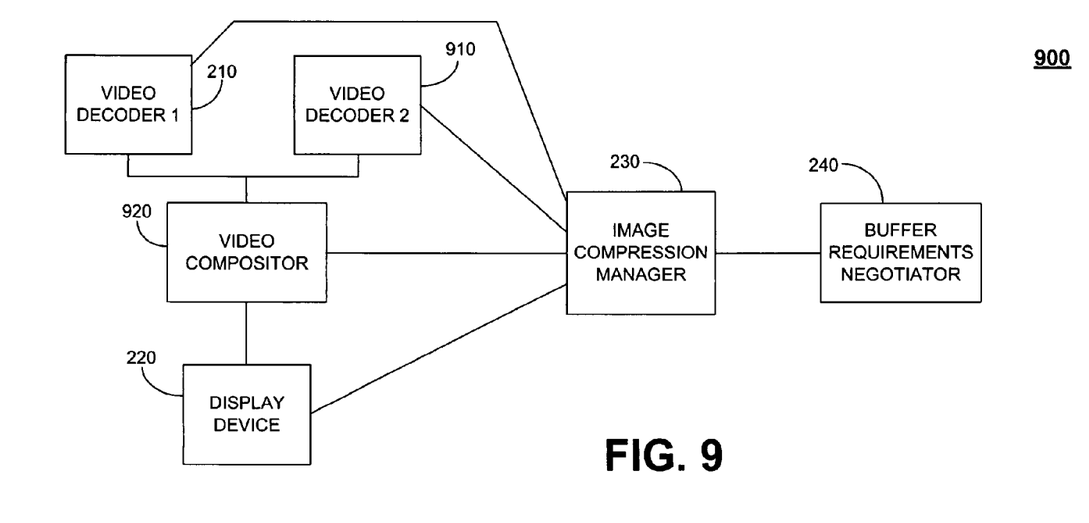
FIG. 9 is a block diagram of a fourth specific implementation of the general architecture of FIG. 1.

FIGS. 7-9 illustrate additional implementations in which buffer sharing is used.

Referring to FIG. 7, a system 700 includes three video processing components communicatively coupled in series: video decoder 210, a video filter 710, and a video compressor 720. Each of components 210, 710, and 720 is communicatively coupled to ICM 230, and ICM 230 is communicatively coupled to BRN 240. Video filter 710 may perform one or more of a variety of filtering operations. For example, video filter 710 may insert a logo into a corner of a decoded video frame, or change the format of a video frame, for example, from an interlaced format to a film format. Video compressor 720 compresses a video frame received from video filter 710, and may use one or more of a variety of compression/coding techniques. Accordingly, the three video processing components 210, 710, and 720 may be used in the configuration illustrated in system 700 to receive a compressed video as input to video decoder 210 and, for example, (1) to insert a logo into each frame, and/or (2) to change the format of the video.

Buffers may be shared between video decoder 210 and video filter 710, and between video filter 710 and video compressor 720. Additionally, it is possible for all three components 210, 710, and 720 to share a buffer. For example, video decoder 210 may store a decoded frame into a buffer, video filter 710 may modify the frame in the buffer, and video compressor 720 may access the modified frame in order to compress the modified frame. As in the implementation of FIG. 2, ICM 230 may manage components 210, 710, and 720 and provide the components' buffer requirements to BRN 240.

Referring to FIG. 8, a system 800 includes three video processing components: video decoder 210 is communicatively coupled to both video compressor 720 and a second video compressor 810. Each of components 210, 720, and 810 is communicatively coupled to ICM 230, and ICM 230 is communicatively coupled to BRN 240. Video compressor 810 may compress video using a compression technique that is different from, or the same as, a compression technique used in video compressor 720.

In one implementation, system 800 is part of an application for providing a web-cast at two different bit rates so that users can view the web-cast over either a dial-up connection or a high-speed connection. For example, a video feed of encoded video from a video camera may be provided to video decoder 210 for decoding. The decoded video frames are then provided to video compressors 720 and 810 that compress the video using different techniques. Video compressor 720 may use a low bit-rate compression algorithm, and video compressor 810 may use a high bit-rate compression algorithm.

Buffers may be shared between video decoder 210 and one or both of video compressors 720 and 810. If both video compressors 720 and 810 need only read the decoded frames provided by video decoder 210, rather than modifying the decoded frames, it is possible for all three components 210, 720, and 810 to share a buffer if the requirements can be reconciled. For example, video decoder 210 may store a decoded frame into a buffer, and ICM 230 may provide that buffer (using a pointer, for example) to both video compressors 720 and 810. As in the implementation of FIG. 7, ICM 230 may manage components 210, 720, and 810 and provide the components' buffer requirements to BRN 240.

Referring to FIG. 9, a system 900 includes four video processing components: video decoder 210 and a second video decoder 910 are communicatively coupled to a video compositor 920, and video compositor 920 is communicatively coupled to display device 220. Each of components 210, 910, 920, and 220 is communicatively coupled to ICM 230, and ICM 230 is communicatively coupled to BRN 240. Video decoder 910 may decode video using a technique that is different from, or the same as, a technique used in video decoder 210. Video compositor 920 may perform one or more of a variety of compositing operations, such as, for example, merging two video feeds into a single video output.

In one implementation, system 900 is part of an application that provides a picture-in-a-picture display of two video feeds. Each of video decoders 210 and 910 receives one of the two video feeds and provides a decoded video frame sequence to video compositor 920. Video compositor 920 merges the two decoded video frame sequences into a single decoded video frame sequence according to the desired picture-in-a-picture parameters. Video compositor 920 provides the merged decoded video frame sequence to display device 220. Other implementations may use video compositor 920, for example, to perform a fade between the two video feeds, or to construct a partially transparent shadow over a portion of a video image.

Buffers may be shared between (1) video decoder 210 and video compositor 920, (2) video decoder 910 and video compositor 920, and (3) video compositor 920 and display device 220. Additionally, it may be possible for video compositor 920 to use one of the input buffers as the output buffer, rather than requiring a separate output buffer to be allocated. As in the implementations of FIGS. 7 and 8, ICM 230 may manage components 210, 910, 920, and 220 and provide the components' buffer requirements to BRN 240.

Referring again to FIG. 8, system 800 also may be used to illustrate the capability of accommodating the addition of components after buffer reconciliation has occurred. In one implementation, system 800 does not initially include second video compressor 810, and system 800 is only supporting a web-cast having, for example, a low bit-rate. During initialization, the buffer requirements of only video decoder 210 and video compressor 720 are reconciled. During run-time, however, video compressor 810 is activated to provide a high bit-rate feed of the web-cast, and ICM 230 requests that BRN 240 attempt to reconcile all three components 210, 720, and 810.

BRN 240 may determine that all three components 210, 720, and 810 can be reconciled with the existing reconciled buffer requirements, in which case video compressor 810 may simply share the buffer that has already been allocated. Alternatively, BRN 240 may determine that a new set of reconciled buffer requirements is needed, and a new buffer may be allocated.

It is also possible that all three components 210, 720, and 810 cannot be reconciled. In such a case, however, it is presumptively possible to reconcile video decoder 210 and video compressor 720, and it also may be possible to reconcile video decoder 210 and video compressor 810. System 800 may determine which reconciliation would be preferable by considering, for example, the amount of copying and converting that would be obviated by each reconciliation. An implementation may choose to reconcile, for example, the high bit-rate path (video decoder 210 and video compressor 810) because more buffers may travel that path than the low bit-rate path.

In implementations in which an additional component is activated after the existing buffer requirements have already been reconciled, the reconciled requirements may be treated as a single set of requirements to be reconciled (if possible) with the buffer requirements of the additional component. That is, BRN 240 may only need to perform a negotiation with two sets of requirements. In systems in which the original reconciliation included a large number of components, and for which the reconciliation was complicated, using the reconciled buffer requirements to perform a two-set negotiation may provide a savings in time and computation.

An additional feature of many of the above implementations is that multiple buffers may be enabled at a given time. For example, referring again to FIG. 2, video decoder 210 may allocate a first buffer for storing a decoded video frame, and before the first buffer is deallocated video decoder 210 may allocate additional buffers for storing subsequent decoded video frames. The same feature may exist in implementations of, for example, FIGS. 7-9.

There are various benefits to enabling multiple buffers, five of which are now described. First, video decoder 210 can decode more frames ahead to help ensure a smooth frame rate even when there is a high variation in per-frame computational complexity.

Second, for I-P-B frame formats in which the frames are processed in a decode order but are displayed in a different order (a display order), the decoded frames may ordinarily need to be reordered into the display order and stored into a memory in the display order until they are displayed. However, if those frames are still loaded in buffers that have not been deallocated, the decoded frame would not need to be stored and reordered into a display order because a display pointer, for example, may be used to point to the buffer with the next frame to be displayed.

Third, multiple components, such as, for example, video decoder 210 and display device 220, can run concurrently, rather than, for example, video decoder 210 needing to wait to allocate a new buffer until display device 220 finishes processing a previously allocated buffer. Fourth, various components, such as, for example, video filter 710, may need to introduce latency and examine several input frames before outputting an output frame associated with the first input frame.

Fifth, video compressor 720, for example, may prefer to look-ahead several frames to perform frame reordering and to guide compression heuristics such as bit-rate allocation. For example, video compressor 720 may notice that the next 32 frames are virtually identical, in which case video compressor 720 may allocate a larger number of bits to the first frame, and a smaller number of bits to each of the following 31 frames.

The above systems and processes have been described primarily with reference to sequences of video frames. However, the systems and processes may be used in other applications, such as, for example, audio and still images. Regarding audio, music and other audio may be processed, for example, in sequential units using methods analogous to the processing of video frames. Similarly, still images, such as, for example, topographical maps, weather maps, medical images, and astronomical data, may be analyzed, for example, by dividing each image into a series of blocks and these blocks may be processed, for example, in ways that are analogous to the processing of video frames.

Implementations may negotiate buffer requirements for a variety of different components, which may also be referred to as modules or entities, for example. Such components may perform a wide variety of functions and be interconnected in many possible configurations including both direct and indirect couplings/connections. An indirect coupling refers to a connection that includes an intervening component.

Although BRN 240 has been described as performing a negotiation in order to reconcile buffer requirements, a particular component may dictate that the component cannot share a buffer or that any shared buffer must have buffer requirements that exactly match those of the particular component. As an example of "exactly matching," the particular component may require that the buffer not have any extended pixels.

Various of the features described may be implemented in one or more processes, devices, or computer readable media embodying instructions for a process. Devices performing various features may include, for example, one or more computers, personal/portable digital assistants ("PDAs"), video cameras, special purpose computing devices, integrated circuits ("ICs") or application-specific ICs, processors, or circuit boards. Computer readable media may include, for example, the storage components of a storage device (for example, a hard disk, a compact disk, a read-only memory ("ROM"), a random access memory ("RAM")), or formatted electromagnetic waves encoding or transmitting instructions. Instructions may be, for example, in software, firmware, hardware, or in an electromagnetic wave. A device including a computer readable medium may include, for example, a computer, a processor, and a compact disk.

A number of implementations have been described. Nevertheless, it will be understood that various modifications may be made. For example, elements of one or more implementations may be combined, deleted, modified, or supplemented to form further implementations. Accordingly, other implementations are within the scope of the following claims.

What is claimed is:

1. A method comprising:

accessing a set of buffer requirements for each of a plurality of components, including at least a first set of buffer requirements relating to a first component and a second set of buffer requirements relating to a second component, wherein the first set of buffer requirements and the second set of buffer requirements differ;

comparing corresponding buffer requirements included in the first set of buffer requirements and the second set of buffer requirements to identify at least one differing buffer requirement;

generating a common buffer requirement that satisfies the at least one differing buffer requirement for both the first set of buffer requirements and the second set of buffer requirements;

determining a first reconciled set of buffer requirements based on the generated common buffer requirement, the first set of buffer requirements, and the second set of buffer requirements;

accessing a third set of buffer requirements relating to a third component, wherein the third set of buffer requirements and the first reconciled set of buffer requirements have at least one differing buffer requirement;

determining a second reconciled set of buffer requirements that satisfies the first reconciled set of buffer requirements and the third set of buffer requirements; and providing the second reconciled set of buffer requirements to one or more components.

2. The method of claim 1 wherein the first, second, and third sets of buffer requirements each relate to data that is to be exchanged between at least two of: the first, second, and third components.

3. The method of claim 2 wherein the data relates to video frame pixels.

4. The method of claim 2 wherein the first and second sets of buffer requirements relate to an output of the first component and an input of the second component, respectively.

5. The method of claim 1 wherein determining a second reconciled set of buffer requirements comprises comparing the first reconciled set of buffer requirements and the third set of buffer requirements to determine if they overlap.

6. The method of claim 1 wherein providing the second reconciled set of buffer requirements to one or more components comprises providing the second reconciled set of buffer requirements to the first, second, and third components.

7. The method of claim 1 wherein providing the second reconciled set of buffer requirements to one or more components comprises providing the second reconciled set of buffer requirements to a component manager.

8. The method of claim 1 further comprising:
allocating a buffer that conforms to the second reconciled set of buffer requirements; and
sharing the buffer between at least two of: the first, second, and third components.

9. The method of claim 8 further comprising:
accessing the buffer by the first component; and
accessing the buffer by the second component.

10. The method of claim 9 wherein:
the first component accesses the buffer by writing to the buffer, and
the third component accesses the buffer by reading from the buffer.

11. The method of claim 1 wherein:
the first component comprises a first video processing component, and accessing a first set of buffer requirements for a first component comprises accessing a set of buffer requirements for the first video processing component,
the second component comprises a second video processing component, and accessing a second set of buffer requirements for a second component comprises accessing a set of buffer requirements for the second video processing component, and
the third component comprises a third video processing component, and accessing a third set of buffer requirements for a third component comprises accessing a set of buffer requirements for the third video processing component.

12. The method of claim 11 wherein the first video processing component comprises one of a video decoder, a video compressor, and a video filter.

13. The method of claim 11 wherein the second reconciled set of buffer requirements comprises one or more of a data format, a width of the buffer, a height of the buffer, a byte alignment requirement, and an extended pixels requirement.

14. The method of claim 1 wherein determining the second reconciled set of buffer requirements comprises determining whether a particular requirement of both the first reconciled set of buffer requirements and the third set of buffer requirements overlap.

15. The method of claim 1 wherein determining the second reconciled set of buffer requirements comprises determining whether a particular requirement of both the first reconciled set of buffer requirements and the third set of buffer requirements is scalable.

16. The method of claim 1 wherein determining the second reconciled set of buffer requirements comprises determining a least common multiple of a particular requirement both the first reconciled set of buffer requirements and the third set of buffer requirements.

17. The method of claim 1 wherein determining the second reconciled set of buffer requirements comprises determining a maximum size among a particular requirement of both the first reconciled set of buffer requirements and the third set of buffer requirements.

18. An article of manufacture comprising machine readable instructions for causing a device to perform at least the following:
receiving a first set of buffer requirements for a first component;
receiving a second set of buffer requirements for a second component, wherein the second set of buffer requirements differs from the first set of buffer requirements;
receiving a third set of buffer requirements for a third component, wherein the third set of buffer requirements differs from the first and second set of buffer requirements and wherein the first component is configured to exchange data with the second component and with the third component;
comparing corresponding buffer requirements included in the first set of buffer requirements, the second set of buffer requirements, and the third set of buffer requirements to identify one or more differing buffer requirements;
determining that the first, second and third sets of buffer requirements are not reconcilable;
identifying the first component and the second component as preferred components based on predetermined criteria;
negotiating a reconciled set of buffer requirements that satisfies the one or more differing buffer requirements for the preferred components; and
making the reconciled set of buffer requirements available to one or more components.

19. The article of claim 18 wherein the first and second sets of buffer requirements each relate to data that is to be exchanged between the first and second components.

20. The article of claim 19 wherein the data relates to video frame pixels.

21. The article of claim 19 wherein the first and second sets of buffer requirements relate to an output of the first component and an input of the second component, respectively.

22. The article of claim 18 wherein negotiating a reconciled set of buffer requirements comprises comparing the first and second sets of buffer requirements to determine if they overlap.

23. The article of claim 18 wherein making the reconciled set of buffer requirements available to one or more components comprises providing the reconciled set of buffer requirements to the first and second components.

24. The article of claim 18 wherein making the reconciled set of buffer requirements available to one or more components comprises providing the reconciled set of buffer requirements to a component manager.

25. The article of claim 18 further comprising:
allocating a buffer that conforms to the reconciled set of buffer requirements; and
sharing the buffer between the first and second components.

26. The article of claim 25 further comprising:
accessing the buffer by the first component; and
accessing the buffer by the second component.

27. The article of claim 26 wherein:
the first component accesses the buffer by writing to the buffer, and
the second component accesses the buffer by reading from the buffer.

28. The article of claim 18 wherein:
the first component comprises a first video processing component and receiving a first set of buffer requirements for a first component comprises receiving a set of buffer requirements for the first video processing component, and
the second component comprises a second video processing component and receiving a second set of buffer requirements for a second component comprises receiving a set of buffer requirements for the second video processing component.

29. The article of claim 28 wherein the first video processing component comprises one of a video decoder, a video compressor, and a video filter.

30. The article of claim 28 wherein the reconciled set of buffer requirements comprises one or more of a data format, a width of the buffer, a height of the buffer, a byte alignment requirement, and an extended pixels requirement.

31. The article of claim 18 wherein negotiating the reconciled set of buffer requirements comprises determining whether a particular requirement of both the first and second sets of buffer requirements overlap.

32. The article of claim 18 wherein negotiating the reconciled set of buffer requirements comprises determining whether a particular requirement of both the first and second sets of buffer requirements is scalable.

33. The article of claim 18 wherein negotiating the reconciled set of buffer requirements comprises determining a least common multiple of a particular requirement of both the first and second sets of buffer requirements.

34. The article of claim 18 wherein negotiating the reconciled set of buffer requirements comprises determining a maximum size among a particular requirement of both the first and second sets of buffer requirements.

35. The article of claim 18 wherein the predetermined criteria comprises a volume of data processed by the preferred components.

36. The article of claim 18 further comprising determining that the first and second set of buffer requirements are reconcilable and the second and third set of buffer requirements are reconcilable.

37. A method comprising:
accessing a set of buffer requirements for each of a plurality of components, including at least a first set of buffer requirements for a first component, a second set of buffer requirements for a second component, and a third set of buffer requirements relating to a third component, wherein the first component is configured to exchange data with the second component and with the third component;
comparing corresponding buffer requirements included in the first set of buffer requirements, the second set of buffer requirements, and the third set of buffer requirements to identify one or more differing buffer requirements;
determining that the first, second and third sets of buffer requirements are not reconcilable;
identifying the first component and the third component as preferred components based on predetermined criteria; and
determining a reconciled set of buffer requirements that satisfies each of the one or more differing buffer requirements of the preferred components.

38. The method of claim 37 further comprising enabling multiple buffers to be used by one or more of the first and second components.

39. The method of claim 37 wherein the predetermined criteria comprises a volume of data processed by the preferred components.

40. A system comprising:
a first component having a first set of buffer requirements;
a second component having a second set of buffer requirements, wherein the second set of buffer requirements differs from the first set of buffer requirements; and
a buffer requirements negotiator configured to
read the first set of buffer requirements and the second set of buffer requirements,
identify at least one differing buffer requirement between the first set of buffer requirements and the second set of buffer requirements,
produce a first reconciled set of buffer requirements that satisfies the at least one differing buffer requirement for both the first set of buffer requirements and the second set of buffer requirements,
identify at least one differing buffer requirement between the first reconciled set of buffer requirements and a third set of buffer requirements for a third component wherein the third set of buffer requirements differs from the first reconciled set of buffer requirements; and
produce a second reconciled set of buffer requirements that satisfies the at least one differing buffer requirement for both the third set of buffer requirements and the first reconciled set of buffer requirements, and
provide the second reconciled set of buffer requirements to the first component, the second component, and the third component.

41. The system of claim 40 wherein the buffer requirements negotiator is further configured to allocate a buffer that conforms to the second reconciled set of buffer requirements, and share the buffer between the first and second components.

42. A system comprising:
means for receiving a set of buffer requirements for each of a plurality of components, including at least a first set of buffer requirements relating to a first component, a second set of buffer requirements relating to a second component, and a third set of buffer requirements relating to a third component, wherein the first set of buffer requirements, the second set of buffer requirements, and the third set of buffer requirements differ and wherein the first component is configured to exchange data with the second component and with the third component;
means for comparing corresponding buffer requirements included in the first set of buffer requirements, the second set of buffer requirements, and the third set of buffer requirements to identify at least one differing buffer requirement;

means for determining that the first, second and third sets of buffer requirements are not reconcilable and for identifying the first component and the second component as preferred components based on predetermined criteria;

means for making the reconciled set of buffer requirements available to the preferred components.

43. The system of claim 42 further comprising:
means for allocating a buffer that conforms to the reconciled set of buffer requirements;
means for sharing the buffer between the preferred components.

44. The system of claim 42 wherein the predetermined criteria comprises a volume of data processed by the preferred components.

* * * * *

UNITED STATES PATENT AND TRADEMARK OFFICE
CERTIFICATE OF CORRECTION

PATENT NO.        : 7,710,426 B1                                                             Page 1 of 1
APPLICATION NO.   : 11/113361
DATED             : May 4, 2010
INVENTOR(S)       : John Samuel Bushell It is certified that error appears in the above-identified patent and that said Letters Patent is hereby corrected as shown below:

In column 4, line 21, delete "looselycoupled" and insert -- loosely-coupled --, therefor.

In column 18, line 3, in Claim 43, after "requirements;" insert -- and --.

Signed and Sealed this
Eighth Day of November, 2011

David J. Kappos
*Director of the United States Patent and Trademark Office*